US008494347B2

(12) United States Patent
Wada et al.

(10) Patent No.: US 8,494,347 B2
(45) Date of Patent: Jul. 23, 2013

(54) ELECTRONIC APPARATUS AND MOVIE PLAYBACK METHOD

(75) Inventors: Kouetsu Wada, Nishitama-gun (JP); Kohei Momosaki, Mitaka (JP); Kenichi Tabe, Ome (JP); Tomonori Sakaguchi, Ome (JP); Shunsuke Takayama, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 13/150,887

(22) Filed: Jun. 1, 2011

(65) Prior Publication Data
US 2011/0305430 A1 Dec. 15, 2011

(30) Foreign Application Priority Data

Jun. 15, 2010 (JP) ................................. 2010-136537

(51) Int. Cl.
*H04N 9/80* (2006.01)
*H04N 5/93* (2006.01)
(52) U.S. Cl.
USPC .......................................... 386/248; 386/281
(58) Field of Classification Search
USPC .................. 386/248, 281, 279, 282, 223, 224, 386/225
See application file for complete search history.

(56) References Cited

U.S. PATENT DOCUMENTS

| 2007/0067723 | A1 | 3/2007 | Hosoda |
| 2007/0165968 | A1 | 7/2007 | Terayoko |
| 2010/0066819 | A1* | 3/2010 | Yu et al. ........................... 348/53 |
| 2010/0245563 | A1* | 9/2010 | Golovchinsky et al. ...... 348/135 |

FOREIGN PATENT DOCUMENTS

| JP | 2000-261754 | | 9/2000 |
| JP | 2005-303907 | A | 10/2005 |
| JP | 2005-340987 | A | 12/2005 |
| JP | 2006-079460 | A | 3/2006 |
| JP | 2006-166208 | A | 6/2006 |
| JP | 2006-295890 | A | 10/2006 |
| JP | 2007-194948 | A2 | 8/2007 |
| JP | 2008-071112 | | 3/2008 |
| JP | 2008-129682 | A | 6/2008 |
| JP | 2008-225089 | | 9/2008 |
| JP | 2009-059042 | | 3/2009 |
| JP | 2009-213620 | | 9/2009 |

(Continued)

OTHER PUBLICATIONS

U.S. Appl. No. 10/578,696, filed May 9, 2006, Hosoda.
Notice of Reasons for Rejection mailed by Japan Patent Office on Nov. 8, 2011 in the corresponding Japanese patent application No. 2010-136537.

*Primary Examiner* — Robert Chevalier
(74) *Attorney, Agent, or Firm* — Knobbe, Martens, Olson & Bear LLP

(57) ABSTRACT

According to one embodiment, an indexing module is configured to analyze a plurality of still images and to generate index information indicative of attributes of the plurality of still images. The index information comprises recognition results of a plurality of face images in the plurality of still images. An extracting module is configured to extract first still images and second still images from the plurality of still images based on the index information. The first still images include face images of a selected person, the second still images are relevant to the selected person, and the second still images comprise at least a still image including a face image of another person relevant to the selected person. A player module is configured to play back a movie using the extracted first still images and the extracted second still images.

6 Claims, 10 Drawing Sheets

FOREIGN PATENT DOCUMENTS

| | | |
|---|---|---|
| JP | 2009-213621 | 9/2009 |
| JP | 2010-086194 A | 4/2010 |
| JP | 2011-107997 A | 6/2011 |
| WO | WO 2005-086478 | 9/2005 |

\* cited by examiner

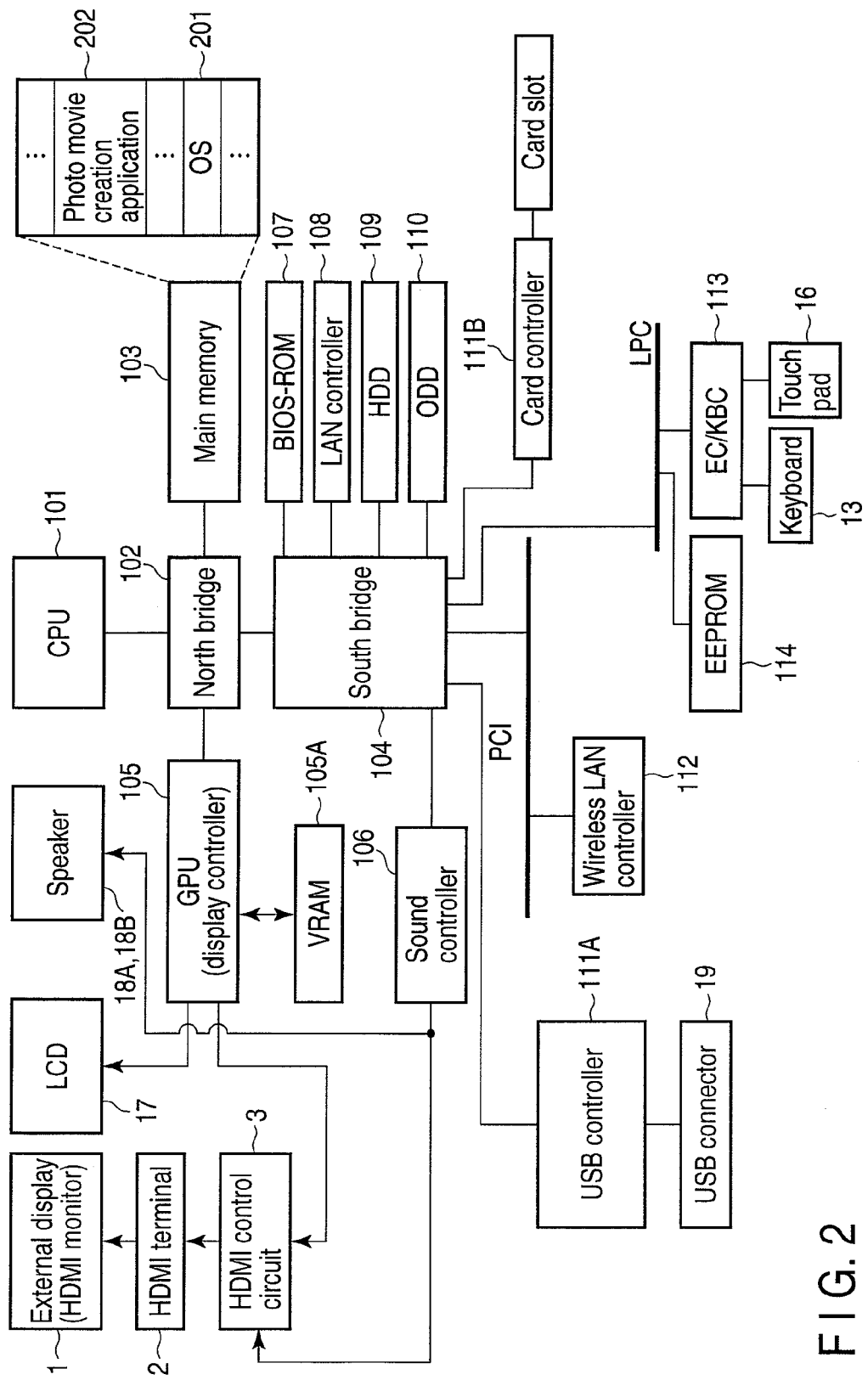
F I G. 2

| Image ID | Date/time of generation | Location of generation | Event ID | Face image information (1) | | | | | | | |
|---|---|---|---|---|---|---|---|---|---|---|---|
| | | | | Face image | Person ID | Position | Size | Smile degree | Sharpness | Frontality | ... |
| 000 | ... | ... | ... | ... | ... | ... | ... | ... | ... | ... | ... |
| 001 | ... | ... | ... | ... | ... | ... | ... | ... | ... | ... | ... |
| 002 | ... | ... | ... | ... | ... | ... | ... | ... | ... | ... | ... |
| 003 | ... | ... | ... | ... | ... | ... | ... | ... | ... | ... | ... |
| 004 | ... | ... | ... | ... | ... | ... | ... | ... | ... | ... | ... |
| ... | ... | ... | ... | ... | ... | ... | ... | ... | ... | ... | ... |

302A

F I G. 4

ELECTRONIC APPARATUS AND MOVIE PLAYBACK METHOD

CROSS-REFERENCE TO RELATED APPLICATIONS

This application is based upon and claims the benefit of priority from Japanese Patent Application No. 2010-136537, filed Jun. 15, 2010; the entire contents of which are incorporated herein by reference.

FIELD

Embodiments described herein relate generally to an electronic apparatus which displays an image, and a movie playback method which is applied to the electronic apparatus.

BACKGROUND

In recent years, various electronic apparatuses, such as a personal computer, a digital camera and a PDA, have been gaining in popularity. Most of such apparatuses have a function of managing still images such as photos. As an image management method, there is known a method of classifying photos into a plurality of groups, for example, based on photographing location data which is added to the photos.

In addition, recently, attention has been paid to a movie creation technique for creating a movie (e.g. photo movie, slideshow, etc.) by using still images such as photos. As the movie creation technique, for example, there is known a technique wherein still images are classified into a plurality of directories corresponding to a plurality of photographing locations and are stored, and a movie is created by using still images in a directory designated by a user.

In this technique, however, use is made of a method in which the user is made to designate the directory that is to be processed. Thus, the still images which are displayed are limited to the still images in the designated directory. It is thus difficult to present to the user a movie including unexpected still images (still images of which the user is unaware), or a movie including still images which are not stored in the same directory but have high relevance.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram illustrating the system configuration of the electronic apparatus of the embodiment;

FIG. 4 is an exemplary view illustrating an example of index information which is used by the photo movie creation application program which is executed by the electronic apparatus of the embodiment;

DETAILED DESCRIPTION

Various embodiments will be described hereinafter with reference to the accompanying drawings.

In general, according to one embodiment, an information processing apparatus comprises an indexing module, an extraction module and a player module. The indexing module is configured to analyze a plurality of still images and to generate index information indicative of attributes of the plurality of still images. The index information comprises recognition results of a plurality of face images in the plurality of still images. The extracting module is configured to extract first still images and second still images from the plurality of still images based on the index information. The first still images include face images of a selected person, the second still images are relevant to the selected person, and the second still images comprise at least a still image including a face image of another person relevant to the selected person. The player module is configured to play back a movie using the extracted first still images and the extracted second still images.

Figure 1:
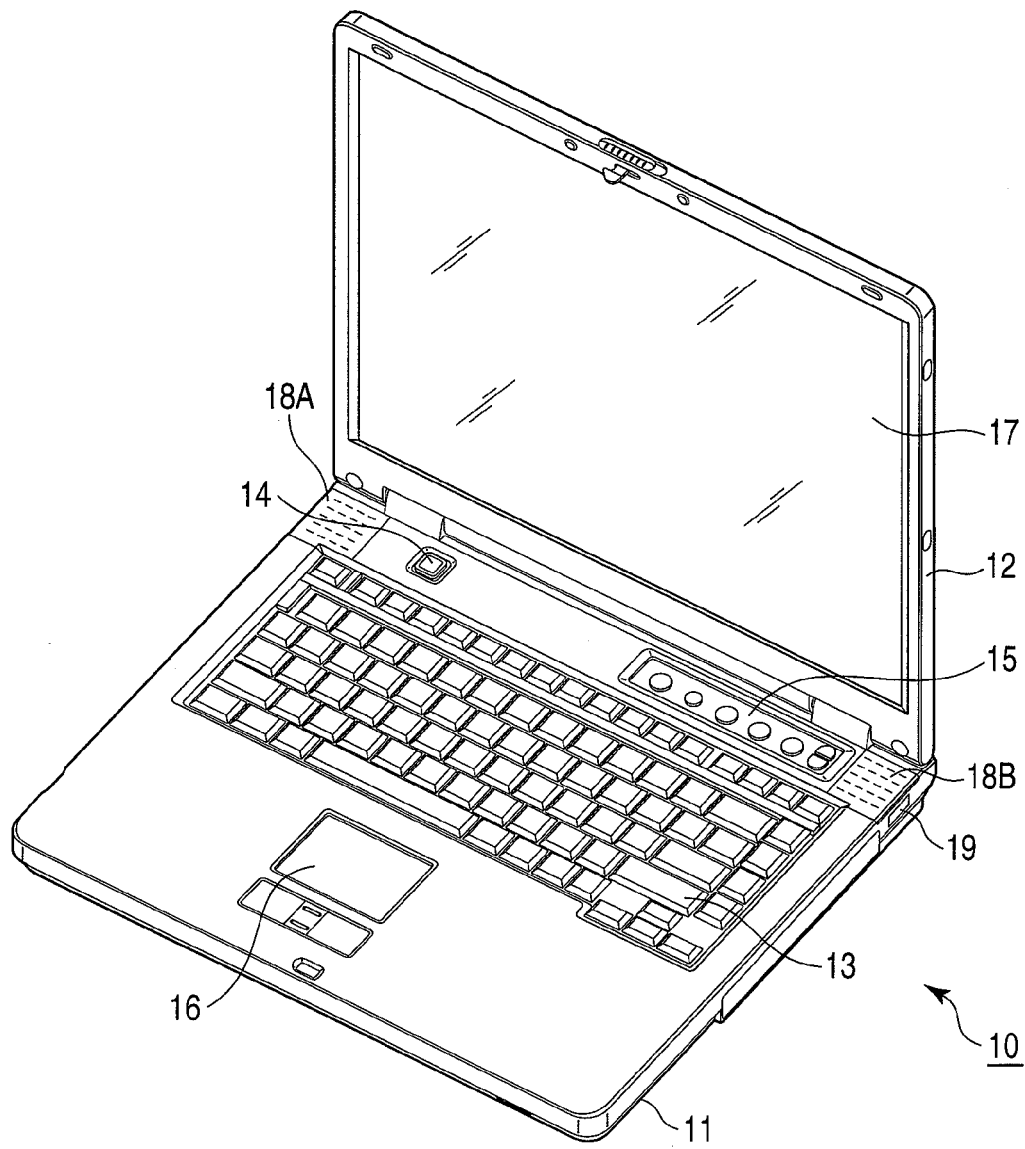
FIG. 1 is an exemplary perspective view illustrating the structure of an electronic apparatus according to an embodiment.

FIG. 1 is a perspective view showing the external appearance of an electronic apparatus according to an embodiment. The electronic apparatus is realized, for example, as a notebook-type personal computer 10. As shown in FIG. 1, the computer 10 comprises a computer main body 11 and a display unit 12. An LCD (liquid crystal display) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the USB (universal serial bus) 2.0 standard. In addition, an external display connection terminal (not shown), which supports, e.g. the HDMI (high-definition multimedia interface) standard, is provided on the rear surface of the computer main body 11. The external display connection terminal is used to output a digital video signal to an external display.

FIG. 2 is a view showing the system configuration of the computer 10.

The computer 10, as shown in FIG. 2, comprises a CPU (central processing unit) 101, a north bridge 102, a main memory 103, a south bridge 104, a GPU (graphics processing unit) 105, a VRAM (video random access memory) 105A, a sound controller 106, a BIOS-ROM (basic input/output system-read only memory) 107, a LAN (local area network) controller 108, a hard disk drive (HDD) 109, an optical disc drive (ODD) 110, a USB controller 111A, a card controller 111B, a wireless LAN controller 112, an embedded controller/keyboard controller (EC/KBC) 113, and an EEPROM (electrically erasable programmable ROM) 114.

The CPU 101 is a processor for controlling the operations of the respective components in the computer 10. The CPU 101 executes an operating system (OS) 201 and various application programs, such as a photo movie creation application program 202, which are loaded from the HDD 109 into the main memory 103. The photo movie creation application program 202 is software which plays back various digital contents which are stored in, e.g. the HDD 109. The photo movie creation application program 202 has a movie generation function (automatic slideshow function). The movie generation function is a function of creating a movie (photo movie, slideshow) by using contents (digital contents) such as still images stored in, e.g. the HDD 109. The photo movie is an intelligent slideshow. Further, the movie generation function includes a function of analyzing the contents which are used for the creation of the movie. The photo movie creation application program 202 plays back the movie which is created by using the contents, and displays the movie on the screen (LCD 17).

The CPU 101 also executes a BIOS that is stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of communicating with the GPU 105 via, e.g. a PCI EXPRESS serial bus.

The GPU 105 is a display controller which controls the LCD 17 that is used as a display monitor of the computer 10. A display signal, which is generated by the GPU 105, is sent to the LCD 17. In addition, the GPU 105 can send a digital video signal to an external display 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display 1, such as a TV, via a single cable. The HDMI control circuit 3 is an interface for sending a digital video signal to the external display 1, which is called "HDMI monitor", via the HDMI terminal 2.

The south bridge 104 controls devices on a PCI (peripheral component interconnect) bus and devices on an LPC (low pin count) bus. The south bridge 104 includes an IDE (integrated drive electronics) controller for controlling the HDD 109 and ODD 110. The south bridge 104 also has a function of communicating with the sound controller 106.

The sound controller 106 is a sound source device and outputs audio data, which is a playback target, to the speakers 18A and 18B. The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 111A communicates with an external device which supports, e.g. the USB 2.0 standard (the external device is connected via the USB connector 19). For example, the USB controller 111A is used in order to receive an image data file which is stored in, for example, a digital camera. The card controller 111B executes data write and data read in/from a memory card such as an SD card, which is inserted in a card slot provided in the computer main body 11.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Figure 3:
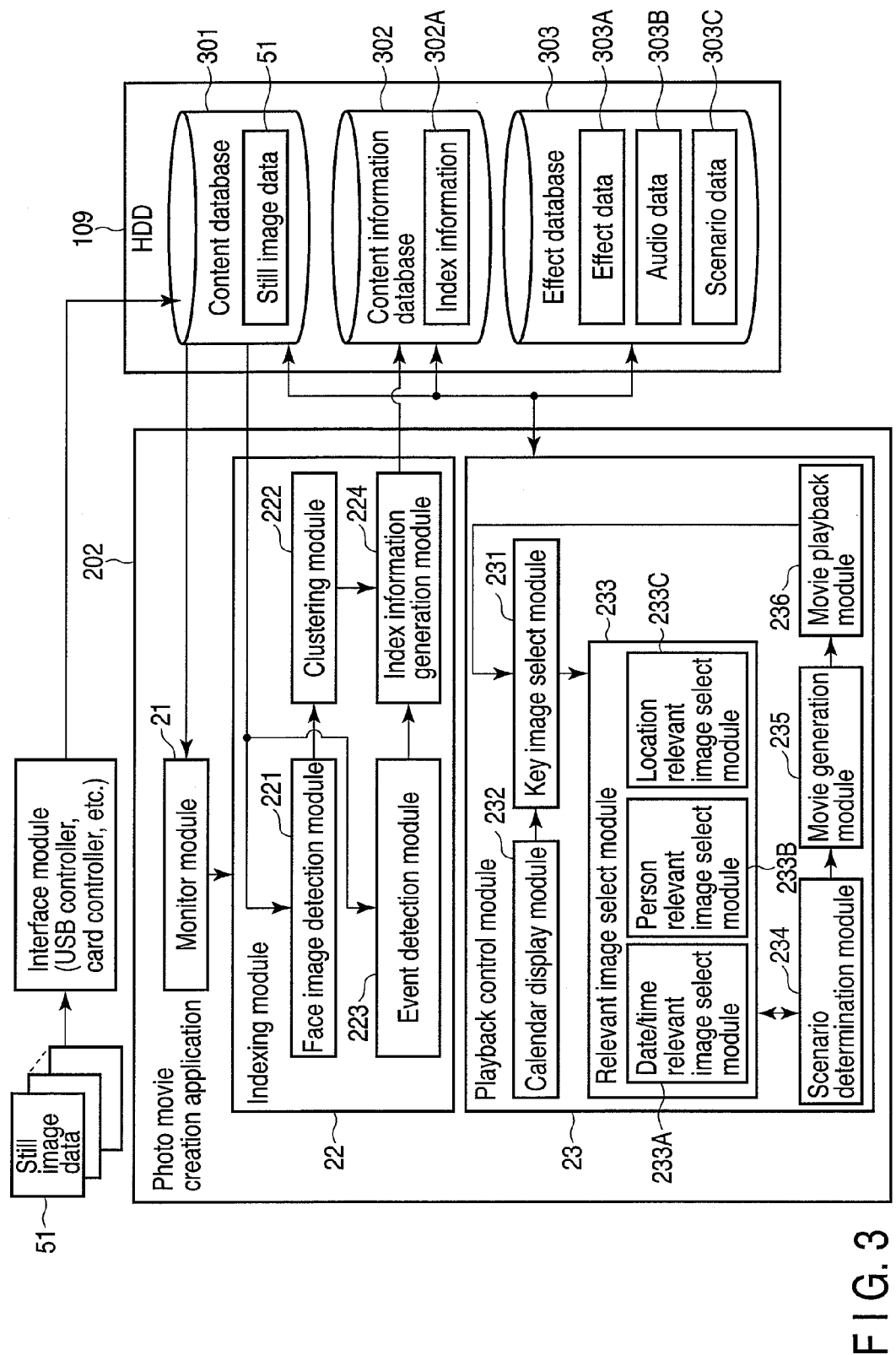
FIG. 3 is an exemplary block diagram illustrating the functional structure of a photo movie creation application program which is executed by the electronic apparatus of the embodiment.

Next, referring to FIG. 3, a functional structure of the photo movie creation application program 202 is described. A description is given of a structure example for realizing a movie generation function, which is one of the functions of the photo movie creation application program 202. The movie generation function is a function for creating a movie (e.g. photo movie, slideshow) by using still images (still image data) 51 stored in a predetermined directory (folder) in the HDD 109, and playing back the created movie. The still images 51 are, for instance, digital photos, or other various still image files (e.g. JPEG files). The term "photo movie (intelligent slideshow)" refers to a movie (moving image) which is generated by using still images (e.g. photos). In the playback of the photo movie, various effects or transitions are applied to the still images. The still images, to which the effects or transitions have been applied, are played back together with music (e.g. a song). The photo movie creation application program 202 can automatically extract still images which are relevant to a certain still image (key image), and can create and play back the photo movie by using the extracted still images. The term "slideshow" refers to a movie (moving image) which successively displays the still images one by one.

The photo movie creation application program 202 monitors the folder (photo folder) in the HDD 109, which is set by the user. If the photo movie creation application program 202 detects that one or more new still images (photo files) have been stored in the photo folder, the photo movie creation application program 202 executes indexing of the one or more new still images and, at the same time, starts a slideshow of the one or more new still images. If the indexing is completed, the photo movie creation application program 202 creates a photo movie based on the one or more new still images, and plays back the created photo movie. In this case, for example, a photo movie may be created from only the one or more new still images, and the created photo movie may be played back. Alternatively, still images relevant to the one or more new still images may be extracted from the still images in the photo folder, a photo movie may be created by using the one or more new still images and the extracted still images, and the photo movie may be played back.

The creation of the photo movie is executed based on one still image (key image). Specifically, still images relevant to a selected key image are automatically extracted, and a photo movie is created by using the extracted still images. Each of a style, music, and a person (face) of interest can be designated as a condition for creating a photo movie. According to the selected style, a still image extraction method and an effect/transition, which are to be used, are determined. In the prior art, photos which are used in creating a movie are designated by the user. On the other hand, the photo movie creation application program 202 automatically extracts photos, which are to be used, from all still images in the photo folder. Thereby, unexpected photos can be found and shown to the user.

In the extraction process, photos with better photographic quality may be extracted according to the smile degree of face images, the sharpness of face images, etc. In addition, a person corresponding to each face image may be recognized by face clustering, and it is possible to extract, for example, photos including face images of the selected person, or photos including face images of another person who has relevance to the selected person. Furthermore, photos may be classified into a plurality of events by using an event grouping technique. In this case, the relevance between events may be estimated based on the relationship between appearing persons in a certain event and appearing persons in another event, and the result of estimation may be used in the extraction process. For example, events in which the same person appears may be estimated to be relevant. For example, the frequency (co-occurrence frequency), with which a person A and another person B appear in the same photo, is high, it may be estimated that an event, to which a photo including the person A belongs, is relevant to an event to which a photo including the person B belongs.

The photo movie creation application program 202 includes a monitor module 21, an indexing module 22 and a playback control module 23.

The monitor module 21 monitors a content database 301 in the HDD 109 at all times, and determines whether a new still image 51 has been stored in the content database 301 in the HDD 109 via an interface unit such as the USB controller 111A or card controller 111B. The content database 301 corresponds to a predetermined directory (the above-described photo folder) in the HDD 109. The still image 51 stored in the content database 301 is used as a content candidate of a movie (photo movie, slideshow). Not only the still images 51, but also a moving image, such as a short movie, may be stored as a content candidate in the content database 301.

The indexing module 22 analyzes the still images 51 in the content database 301, and generates index information indicative of an attribute of each of the still images 51. The indexing by the indexing module 22 is started, for example, triggered by the storage of one or more new still images (photo files) in the content database 301. In other words, when one or more new still images have been stored in the content database 301, the indexing module 22 generates the index information corresponding to the new still image(s).

The indexing module 22 has a face recognition function. The index information also includes a recognition result of face images included in the still images 51.

The indexing module 22 comprises a face image detection module 221, a clustering module 222, an event detection module 223 and an index information generation module 224.

The face image detection module 221 detects a face image from the still image 51 that is a target of indexing (e.g. a still image newly stored in the photo folder). The face image can be detected, for example, by analyzing the features of the still image 51 and searching for a region having a feature similar to a face image feature sample which is prepared in advance. The face image feature sample is characteristic data which is obtained by statistically processing face image features of many persons. By the face detection process, the region corresponding to the face image included in the still image 51 is detected, and the position (coordinates) and size of the region are detected.

In addition, the face image detection module 221 analyzes the detected face image. The face image detection module 221 calculates, for example, the smile degree, sharpness, frontality, etc. of the detected face image. The smile degree is an index indicative of the degree of a smile of the detected face image. The sharpness is an index indicative of the degree of sharpness of the detected face image (e.g. non-blurredness). The frontality is an index indicative of the degree at which the detected face image is directed to the front side. The face image detection module 221 outputs the information indicative of the detected face image to the clustering module 222.

The clustering module 222 subjects the detected face image to a clustering process, thereby classifying the detected face image on a person-by-person basis. Face images having similar face image features are recognized as the face images of the same person. Based on the result of the clustering process, the clustering module 222 allocates identification information (person ID) of the person to each face image. The same person ID is allocated to the face images of the same person. The clustering module 222 outputs the attribute of each face image (the smile degree, sharpness, frontality, person ID) to the index information generation module 224.

The event detection module 223 detects an event corresponding to the still image 51 which is an indexing target. The event detection module 223 classifies, for example, still images 51, which are generated within a predetermined period (e.g. one day), into the same event, based on the date and time of generation (date and time of imaging) of each of the still images 51 of the indexing target. The event detection module 223 allocates to the still image 51 of the indexing target the identification information (event ID) of the event to which the still image 51 of the indexing target has been classified. The event detection module 223 outputs the event ID, which has been allocated to the still image 51 of the indexing target, to the index information generation module 224.

The index information generation module 224 generates index information 302A, based on the processing results by the face image detection module 221 and clustering module 222.

FIG. 4 shows a structure example of the index information 302A. The index information 302A includes a plurality of entries corresponding to the still images 51. Each entry includes an image ID, a date/time of generation (date/time of imaging), a location of generation (location of imaging), an event ID, and face image information. In the entry corresponding to a certain still image, the image ID is indicative of identification information which is unique to the still image. The date/time of generation is indicative of the date/time (date/time of imaging) at which the still image was generated. The location of generation is indicative of the location (position) where the still image was generated (captured). For example, information, which is added to the still image data, is used for the date/time of generation and the location of generation. The location of generation is indicative of, for example, position information which is detected by a GPS receiver when the still image data is generated (e.g. when the photo corresponding to the still image data is taken). The event ID is indicative of identification information which is uniquely allocated to the event corresponding to the still image. The face image information is recognition result information of face images included in the still image. The face image information includes, for example, a face image (e.g. a path indicating the location of storage of the face image), person ID, position, size, smile degree, sharpness and frontality. When a plurality of face images are included in one still image 51, the index information 302A corresponding to the one still image 51 includes face image information corresponding to each of the face images.

The index information generation module 224 stores the generated index information 302A in the content information database 302.

By the above-described structure, the indexing module 22 can generate the index information 302A corresponding to the still image 51 that is input, and can store the generated index information 302A in the content information database 302.

The playback control module 23 extracts, based on the index information 302A, still images which are relevant to a selected still image (key image) from the still images 51 in the content database 301, and creates and plays back a photo movie or slideshow by using the relevant still images. The playback control module 23 comprises, for example, a key image select module 231, a calendar display module 232, a relevant image select module 233, a scenario determination module 234, a movie generation module 235, and a movie playback module 236.

The key image select module 231 selects a key image (key still image) from still images 51 stored in the content database 301. The key image select module 231 may also determine a still image, which is included in a movie (photo movie or slideshow) that is being displayed, to be the key image. Specifically, when an image in a photo movie or slideshow, which is being played back, is designated by the user, the key image select module 231 determines the designated image to be the key image. If a key image is not designated by the user while the photo movie or slideshow is being played back, the key image select module 231 may determine, for example, the last still image, which is included in the played-back photo movie or slideshow, to be the key image.

The key image select module 231 may select a key image by using a calendar screen in which still images 51 are disposed on a calendar. The key image select module 231 determines, for example, the still image, which is designated by the user with use of the calendar screen, to be the key image.

Further, the key image select module 231 may determine, for example, a face image, which is selected by the user, to be a key face image. In this case, still images relevant to a person corresponding to the key face image are extracted from the content database 301, and the extracted still images are used for the creation of the movie (photo movie or slideshow).

The relevant image select module 233 selects (extracts) still images relevant to the key image (key face image) from the still images 51 stored in the content database 301. The still images relevant to the key image are still images having relevance to the key image with respect to, e.g. the date/time, person or location. The relevant image select module 233 extracts the still images relevant to the key image, for example, by using the index information 302A stored in the content information database 302. Besides, in place of the still images relevant to the key image (key face image), or in addition to the still images relevant to the key image (key face image), the relevant image select module 233 may select (extract) one or more still images corresponding to a selected style, from the still images 51 stored in the content database 301. The still image corresponding to a selected style is a still image meeting an image extraction condition associated with the selected style (the condition is designated by combining the date/time, person and/or location). The image extraction condition is stipulated in advance with respect to each of styles.

The relevant image select module 233 comprises a date/time relevant image select module 233A, a person relevant image select module 233B and a location relevant image select module 233C.

The date/time relevant image select module 233A selects (extracts), from the still images 51 stored in the content database 301, still images having the date/time of generation which is relevant to the date/time of generation of the key image. For example, based on the index information 302A, the date/time relevant image select module 233A selects (extracts) still images which are generated during the same period (the period designated by, e.g. a day, a month, a time of year, a season, or a year) as the date/time of generation of the key image. In addition, for example, based on the index information 302A, the date/time relevant image select module 233A selects (extracts) still images which are generated during the same day, the same week, the same month, etc. (e.g. the same day of the previous year, or the same month two years later) during a period different from the date/time of generation of the key image.

The person relevant image select module 233B selects (extracts) still images which are relevant to a key face image (a face image included in a key image), from the still images 51 stored in the content database 301. The still images relevant to the key face image include, for example, a still image including a face image of the same person as the key face image, and a still image including a face image of another person relevant to the person corresponding to the key face image. Other persons relevant to the person corresponding to the key face image include, for example, a person included in the same still image as the key face image.

The location relevant image select module 233C selects (extracts) still images which are generated at a location relevant to the location of generation of the key image, from the still images 51 stored in the content database 301.

The scenario determination module 234 determines a scenario of a movie that is to be created (e.g. photo movie). The scenario is, for example, information (scenario information) indicative of effects which are used in a plurality of chapters (time segments) in a movie sequence that is to be created, and attributes of still images which are used in the plurality of chapters. Specifically, the scenario stipulates effects and still image attributes with respect to each of time segments which are called "chapters".

In the present embodiment, for example, 24 kinds of scenario information are stored in advance in an effect database 303 as scenario data 303C. The scenario determination module 234 determines one of the 24 kinds of scenario information to be a scenario which is used for the creation of the movie (e.g. photo movie). The determination of the scenario may be executed according to the style selected by the user. In other words, the scenario information to be used is determined in accordance with the selected style. In the embodiment, for example, eight kinds of styles (Happy, Fantastic, Ceremonial, Cool, Travel, Party, Gallery, Biography) are prepared in advance. In addition, for example, three kinds of scenario information are prepared in advance in association with each of the styles. The scenario determination module 234 automatically selects an arbitrary one of the three kinds of scenario information corresponding to the style selected by the user, and determines the selected scenario information to be the scenario of the movie (e.g. photo movie) that is to be created. Instead of the user selecting the style, the scenario determination module 234 may automatically select an arbitrary one of the eight kinds of styles. In this case, the style to be used may be determined, for example, based on the features of the still images extracted by the relevant image select module 233 (e.g. the number of appearing persons (the number of face images), the smile degree of the face image, etc.)

As described above, an arbitrary one of the three kinds of scenario information corresponding to the selected style is selected as a scenario of the movie (e.g. photo movie) that is to be created. It is possible to use, for example, a random number when this scenario is selected. Thereby, even if the same style is selected, photo movies can be created by using different scenarios at each time. The attribute of the still images, which are used for the creation of the photo movie, varies depending on the scenario that is used. Therefore, to change the scenario that is used may increase the possibility that unexpected still images are found and shown to the user.

Furthermore, the scenario determination module 234 determines music (a song) which is used for the creation of the photo movie. In the embodiment, a plurality of music (songs) are stored in the effect database 303 as audio data 303B. The scenario determination module 234 determines the music (audio data) that is to be used, for example, in accordance with the selected style, or in accordance with the features (e.g. the number of appearing persons (the number of face images)) of the still images extracted by the relevant image select module 233. The music to be used may be designated by the user.

Based on the determined scenario information, the movie generation module 235 generates a photo movie. In this case, the movie generation module 235 selects, from the still images extracted by the relevant image select module 233, at least one still image corresponding to the still image attribute of each chapter indicated by the scenario information. The movie generation module 235 creates the photo movie by allocating the at least one still image, which has been extracted, to each chapter.

The movie playback module 236 plays back the created photo movie by applying the effect corresponding to each chapter, which is indicated by the scenario information, to the still image allocated to each chapter.

In the meantime, the determined scenario information may be used in the creation of a slideshow. In this case, the movie generation module 235 selects, from the still images extracted by the relevant image select module 233, at least one still image corresponding to the still image attribute of each chapter indicated by the scenario information. The movie generation module 235 creates the slideshow by allocating the at least one still image, which has been extracted, to each chapter, that is, determines the still images to be used and the timing of playback of the still images. The movie playback module 236 plays back the created slideshow.

Figure 5:
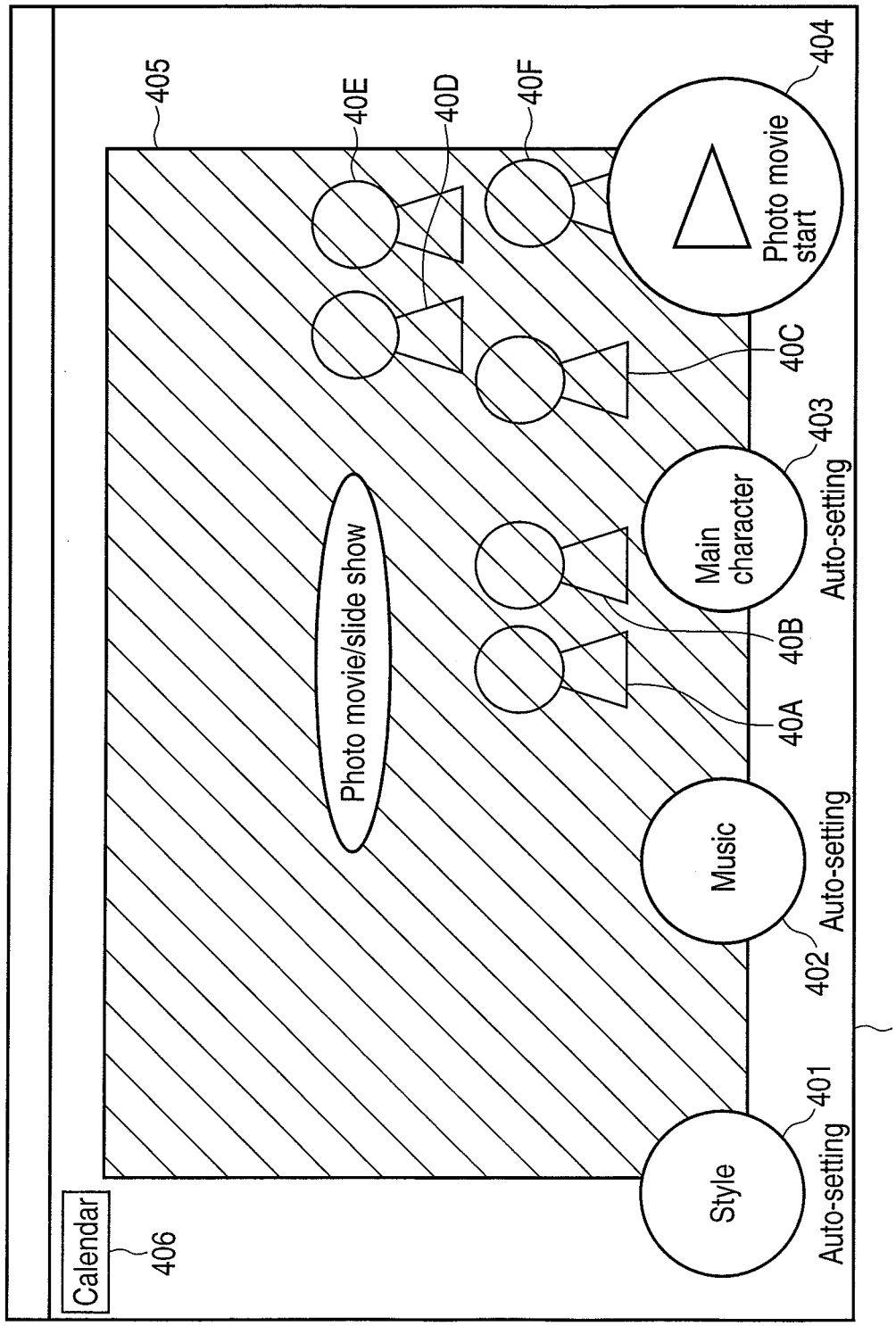
FIG. 5 is an exemplary view illustrating an example of a main screen which is displayed by the electronic apparatus of the embodiment.

FIG. 5 shows an example of a main screen 40 which is displayed by the photo movie creation application program 202. The main screen 40 includes, for example, a "style" button 401, a "music" button 402, a "main character" button 403, a "start" button 404, a movie playback screen 405, and a "calendar" button 406.

The movie playback screen 405 is a screen for displaying a generated photo movie or slideshow. On the movie playback screen 405, the photo movie or slideshow, which is generated by the playback control module 23 (movie generation module 235), is successively played back and displayed. FIG. 5 shows an example in which persons 40A to 40F appear on the image of the photo movie or slideshow, which is being played back.

When the movie playback screen 405 has been clicked by the user's operation of the pointing device while the photo movie or slideshow is being displayed, the photo movie creation application program 202 pauses the playback of the photo movie (slideshow) and determines the image, which is currently played back, to be the key image. If the image, which is being displayed, is an image which is created by combining a plurality of still images, the photo movie creation application program 202 may determine one of these still images to be the key image. Needless to say, one of the plural still images, which have been clicked by the user, may be determined to be the key image.

The "main character" button 403 is a button for starting the selection of a person of interest (protagonist) in to be generated photo movie. Responding to the pressing of the "main character" button 403, the key image select module 231 displays a list of persons appearing in the key image (face image select screen). For example, after selecting the key image by using the movie playback screen 405, the user presses the "main character" button 403 and instructs the start of the selection of the key face image (i.e. the display of the face image select screen).

Figure 6:
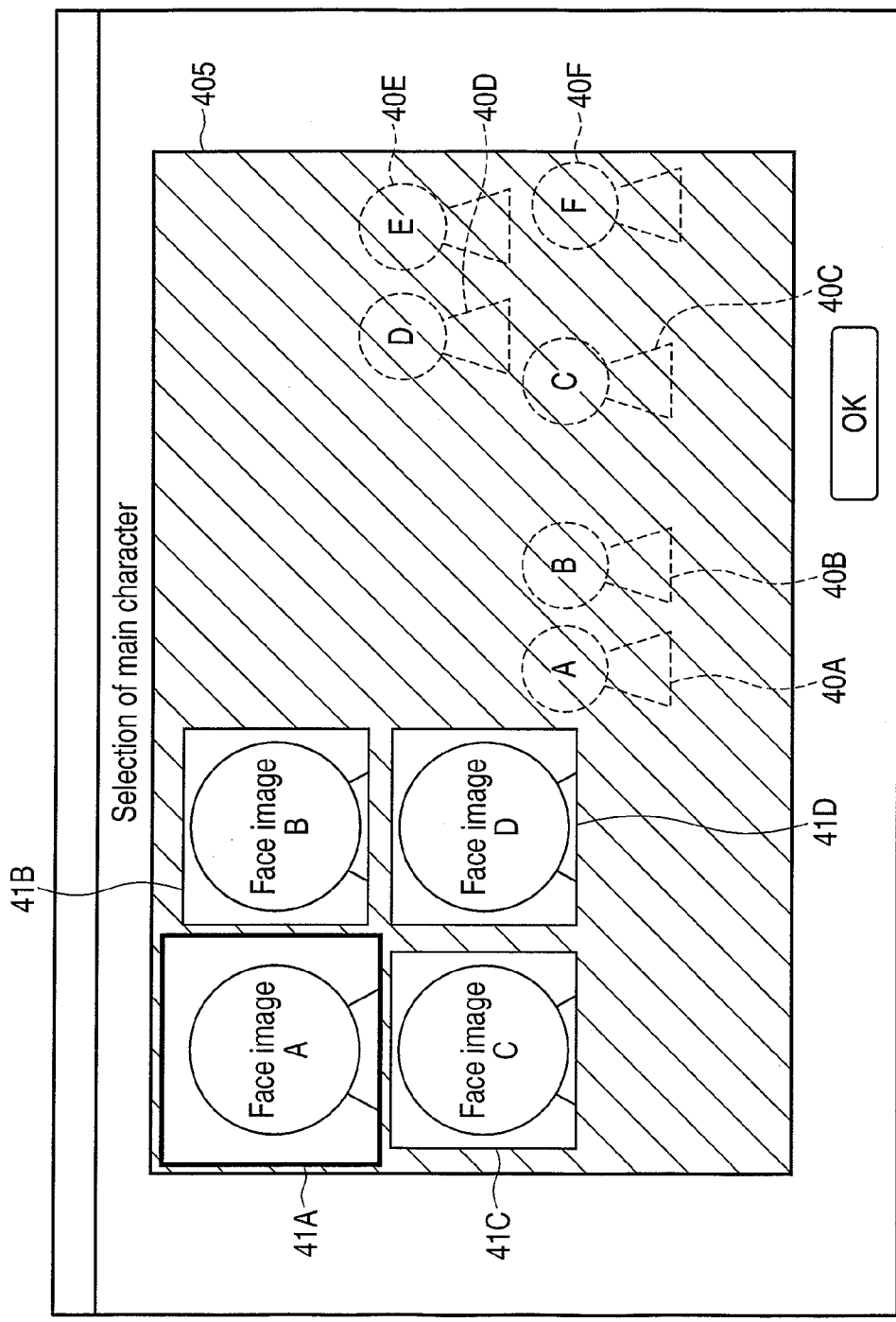
FIG. 6 is an exemplary view illustrating an example of a protagonist select screen which is displayed by the electronic apparatus of the embodiment.

FIG. 6 shows an example of a face image select screen 41 for selecting a key face image. The face image select screen 41 displays a list of face images (face images 41A to 41D) included in a key image. The key image select module 231 selects, from the persons 40A to 40F appearing in the key image, for example, persons (e.g. persons 40A to 40D) who appear in still images the number of which is a threshold value or more, and displays the face images 41A to 41D corresponding to the selected persons 40A to 40D on the movie playback screen 405.

Using the face image select screen 41, the user selects the face image (face image 41A in this example) of the person of interest from among the face images 41A to 41D. The key image select module 231 determines the selected face image 41A to be the key face image (main character). The number of face images to be selected may be plural. When an operation of selecting a face image with use of the face image select screen 41 is not performed (e.g. when the "main character" button 403 is not pressed), the key image select module 231 may select, from among the face images included in the key image, a key image, which meets a predetermined condition, to be the key face image.

The "style" button 401 on the main screen 40 of FIG. 5 is a button for starting the selection of the style of the photo movie. Responding to the pressing of the "style" button 401, the photo movie creation application program 202 displays a style select screen. The style select screen displays a list of the above-described eight kinds of styles (Happy, Fantastic, Ceremonial, Cool, Travel, Party, Gallery, Biography). The user can select a desired style.

The "music" button 402 is a button for starting the selection of the music (audio data) which is used for the photo movie. Responding to the pressing of the "music" button 402, the photo movie creation application program 202 displays the list of music (music select screen). The user can select a desired music.

The "start" button 404 is a button for starting generation and playback of the photo movie. Responding to the pressing of the "start" button 404, the photo movie creation application program 202 starts the creation of the photo movie. Then, the photo movie creation application program 202 plays back the created photo movie, and displays the photo movie on the movie playback screen 405.

The flow of the photo movie playback operation is described below. The photo movie is created based on a key image (an image which is currently displayed on the main screen 40, or an image selected with use of the calendar screen).

<Example in which an Image Currently Displayed on the Main Screen 40 is Used as a Key Image>

(1) Click the main screen 40 while a slideshow/photo movie is being played back.

(2) Select a style (default is "auto-setting").

(3) Select music for use in the photo movie (default is "auto-setting").

(4) Select a person of interest (default is "auto-setting").

(5) Click the "start" button 404.

When all of the style, music and person of interest may be "auto-setting", it should suffice if the user clicks the main screen 40 and then clicks the "start" button 404 which is displayed.

<Example in which an Image Selected with Use of the Calendar Screen is Used as a Key Image>

(1) Click the "calendar" button on the main screen 40.

(2) Select the date/time of imaging of a photo which serves as a base, and display a list of photos.

(3) Select the photo, which serves as a base, from the list of photos, and clicks the "start" button 404.

(4) Select a style on the main screen 40 (default is "auto-setting").

(5) Select music for use in the photo movie on the main screen 40 (default is "auto-setting").

(6) Select a person of interest (default is "auto-setting").

(7) Click the "start" button 404.

Figure 7:
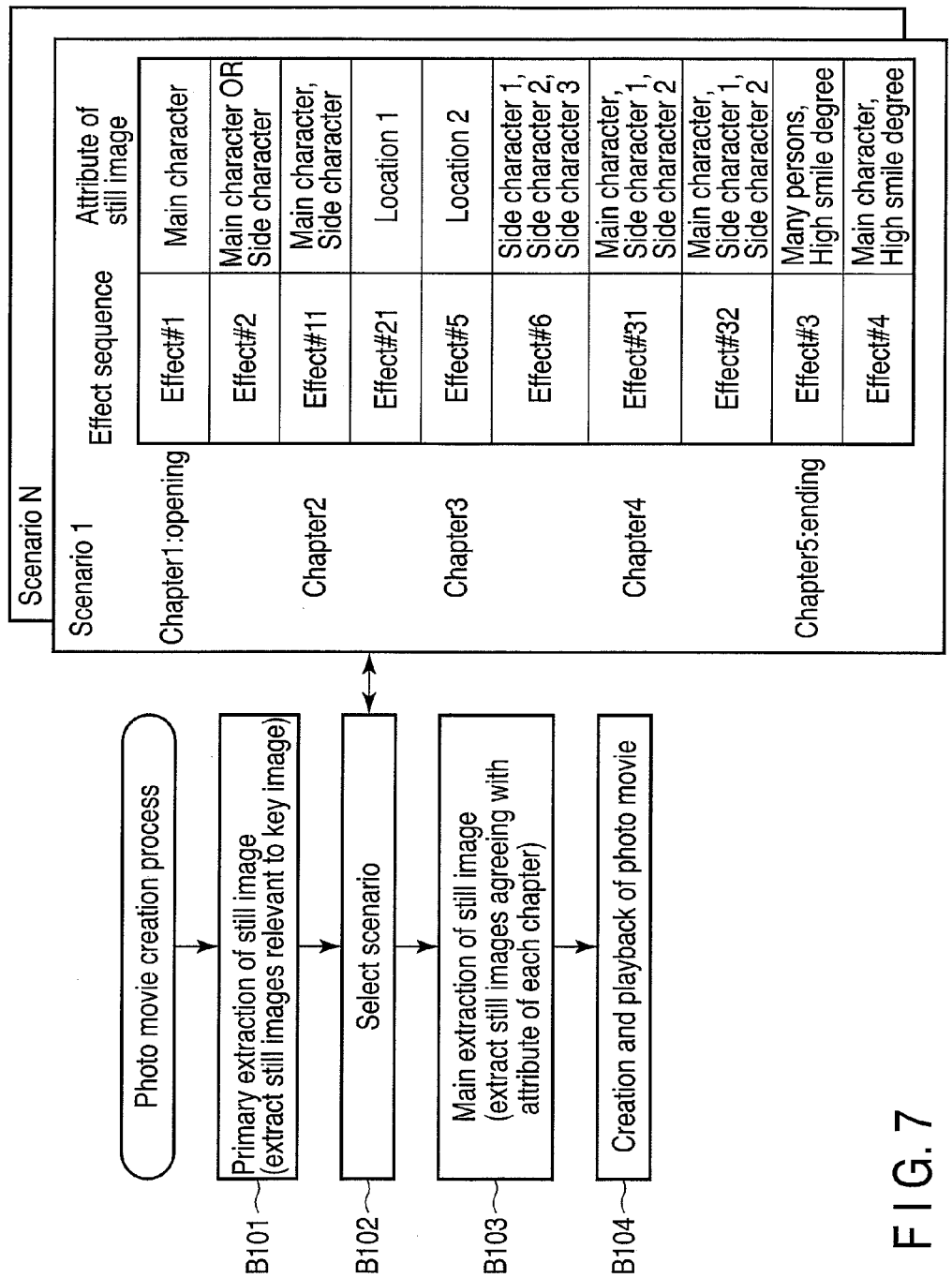
FIG. 7 is an exemplary view illustrating the outline of the procedure of a photo movie creation process which is executed by the electronic apparatus of the embodiment.

Next, referring to FIG. 7, the outline of the procedure of a photo movie creation process is described.

To start with, based on the index information, the photo movie creation application program 202 extracts (primary extraction) still images, which are relevant to a key image (key face image), from the content database 301 (block B101). In block B101, the photo movie creation application program 202 extracts, for example, still images relevant to a selected person (main character) from the content database 301.

Then, the photo movie creation application program 202 selects a scenario which is used for the creation of a photo movie (block B102). In block B102, the photo movie creation application program 202 selects one of a plurality of scenario information items which are prepared in advance, in accordance with the selected style or characteristic values of the still images extracted in block B101. Each scenario information item specifies the order of effects (effect sequence) which is used in a plurality of chapters (scenes) constituting the sequence of the photo movie, and the attributes of still images (still image attributes) which are used in the plurality of chapters. In FIG. 7, it is assumed that the sequence of the photo movie comprises five chapters (chapters 1, 2, 3, 4 and 5). Chapter 1 is an opening scene of the photo movie, and chapter 5 is an ending scene of the photo movie. One or more effects are defined in each chapter (two effects in this example), and still image attributes are defined in association with each effect.

As the still image attributes, use may be made of, for example, person attributes (face attributes). For example, a main character (leading role), a side character (supporting role), a smile degree, sharpness, and the number of appearing persons may be used as the person attributes. The term "main character" refers to a person who is to become the protagonist of the photo movie, that is, a person (face) of interest. For example, the person corresponding to the above-described key face image may be determined to be the main character. The term "side character" refers to another person relevant to the main character. For example, a person (face) with a high frequency of co-occurrence with the main character may be determined to be the side character (supporting role). The person attribute may designate a plurality of side characters. A plurality of persons (faces) with a high frequency of co-occurrence with the main character (protagonist) may be determined to be the side characters. Not only the person attributes but also location attributes may be used as the still image attributes. The location attribute designates the location of imaging of still images which are used.

In scenario information 1 in FIG. 7, for example, two effects (Effect #1, Effect #2) are stipulated in chapter 1, and a still image attribute "Main character" is associated with Effect #1, and a still image attribute "Main character OR Side character" is associated with Effect #2. The still image attribute "Main character" designates that a still image in which the main character (protagonist) appears should be used. The still image attribute "Main character OR Side character" designates that a still image in which either the main character or side character appears should be used. Some other examples of the still image attributes are as follows.

Still image attributes "Main character, Side character", which are associated with Effect #11 of Chapter 2, designate that use should be made of a still image in which both the main character and the side character appear. Still image attributes "Side character 1, Side character 2, Side character 3", which are associated with Effect #6 of Chapter 3, designate that use should be made of a still image in which all three side character (side character 1, side character 2 and side character 3) appear. Still image attributes "Many persons, High smile degree", which are associated with Effect #3 of Chapter 5, designate that use should be made of a still image in which a number of persons, which is a threshold value of more, appear and the smile degree is high. Still image attributes "Main character, High smile degree", which are associated with Effect #4 of Chapter 5, designate that use should be made of a still image in which the main character appears and the smile degree of the main character is a threshold value or more. In this manner, the person attributes can designate that either the main character or the side character, or both the main character and the side character should appear in each chapter.

Subsequently, the photo movie creation application program 202 further extracts (main extraction) one or more still images, which correspond to the still image attributes of each chapter indicated by the selected scenario information, from the still images extracted in block 101 (block B103). The photo movie creation application program 202 creates a photo movie by allocating the extracted still images to each chapter, and plays back the created photo movie (block B104). In block B104, the photo movie creation application program 202 applies the effect corresponding to each chapter, which is indicated by the scenario information, to the still images allocated to each chapter.

Figure 8:
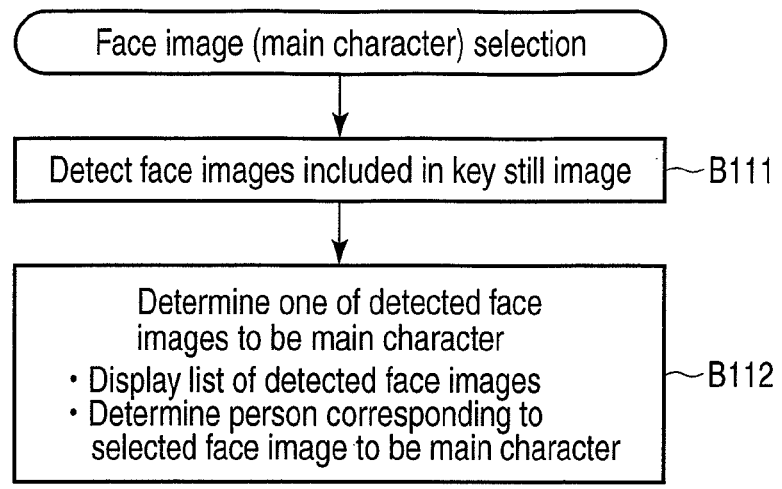
FIG. 8 is an exemplary flow chart illustrating the procedure of a key face image (protagonist) select process which is executed by the electronic apparatus of the embodiment.

Next, referring to a flow chart of FIG. 8, an example of the procedure of a key face image (main character) select process is described.

To start with, the photo movie creation application program 202 detects face images included in a key image (key still image) (block B111). Then, the photo movie creation application program 202 determines one of the detected face images to be the main character (block B112). In block B112, the photo movie creation application program 202 displays a list of detected face images (face image list), and determines a person corresponding to the face image, which is selected by the user from the face image list, to be the main character. In the case where the number of persons appearing in the key image is one, this one person may be determined to be the main character without displaying the face image list.

Figure 9:
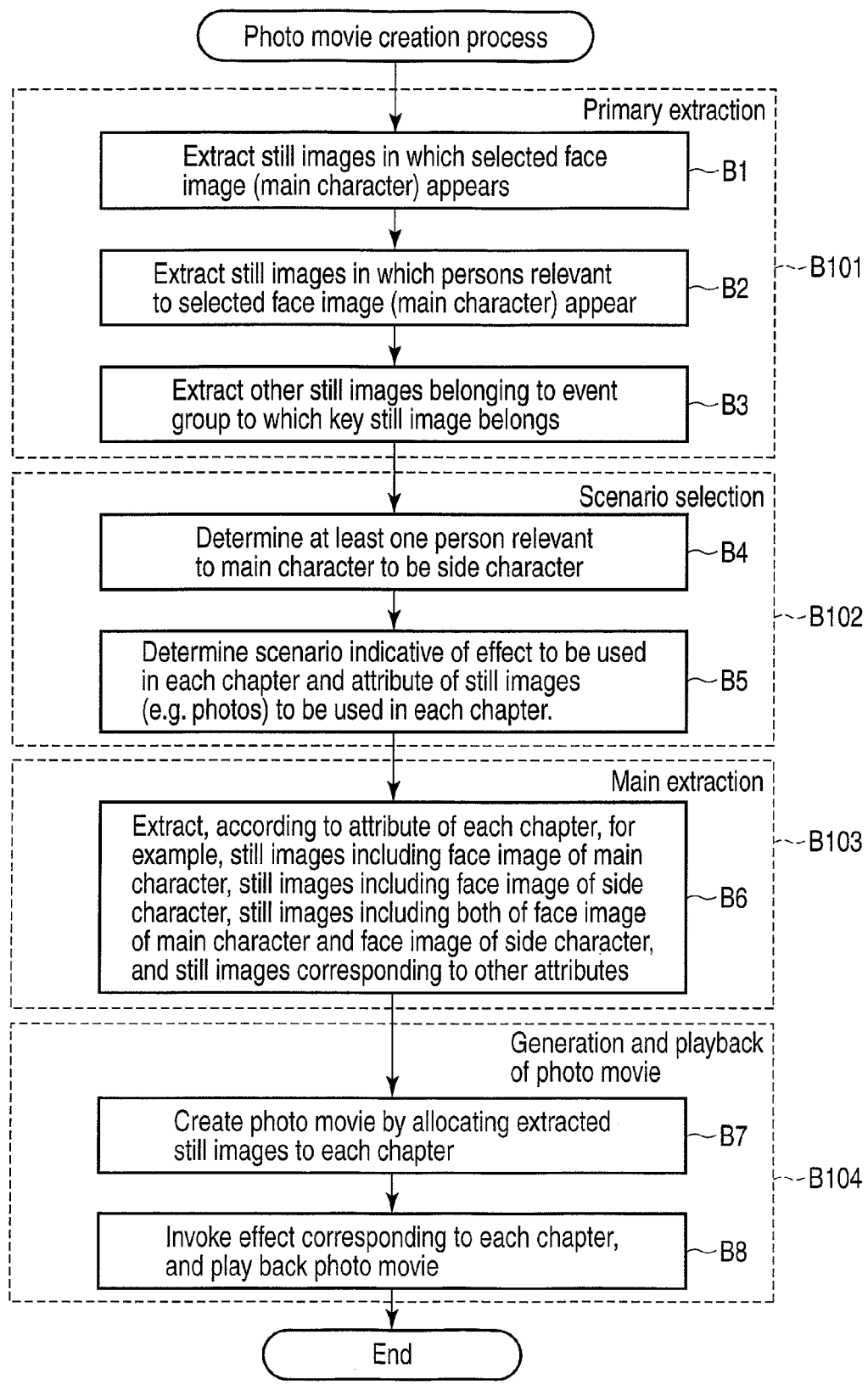
FIG. 9 is an exemplary flow chart illustrating the procedure of the photo movie creation process which is executed by the electronic apparatus of the embodiment.

Next, referring to a flowchart of FIG. 9, an example of the procedure of a photo movie creation process is described. Responding to the pressing of the "start" button 404, the photo movie creation application program 202 starts the following photo movie creation process.

To start with, based on the index information, the photo movie creation application program 202 extracts still images, in which a face image of a selected person (main character) appears, from the still images 51 stored in the content database 301 (block B1). Then, based on the index information, the photo movie creation application program 202 extracts still images, in which another person relevant to the main character appears, from the still images 51 stored in the content database 301 (block B2). The person relevant to the main character is, for instance, each of other persons who are included in the same still image as the main character. In addition, the photo movie creation application program 202 extracts still images belonging to the event (event group), to which the key still image belongs, as still images relevant to the main character (block B3). The primary extraction process of block B101 in FIG. 7 is executed by the process of blocks B1 to B3. In the meantime, in the primary extraction process, still images meeting an image extraction condition, which corresponds to a selected style, may also be extracted, in addition to the still images in which the face image of the selected person (main character) appears, and the still images in which the face image of another person relevant to the main character appears.

Then, the photo movie creation application program 202 determines at least one person relevant to the main character to be a side character (supporting role) (block B4). Subsequently, the photo movie creation application program 202 determines a scenario which is indicative an effect that is to be used in each chapter and an attribute of still images which are to be used in each chapter (block B5). The scenario select process in block B102 in FIG. 7 is executed by the process of blocks B4 to B5.

Following the above, according to the still image attributes (e.g. person attribute, location attribute, etc.) of each chapter, the photo movie creation application program 202 extracts, from the still images which have been extracted by the primary extraction, for example, still images including the face image of the main character, still images including the face image of the side character, still images including both the face image of the main character and the face image of the side character, and still images corresponding to other attributes (block B6). Thereby, the still images corresponding to the still image attributes of each chapter are extracted (main extraction).

Thereafter, the photo movie creation application program 202 creates a photo movie by allocating the extracted still images to each chapter (block B7). The photo movie creation application program 202 plays back the photo movie by applying the effect corresponding to each chapter, which is indicated by the scenario information, to the still images allocated to each chapter (block B8).

Figure 11:
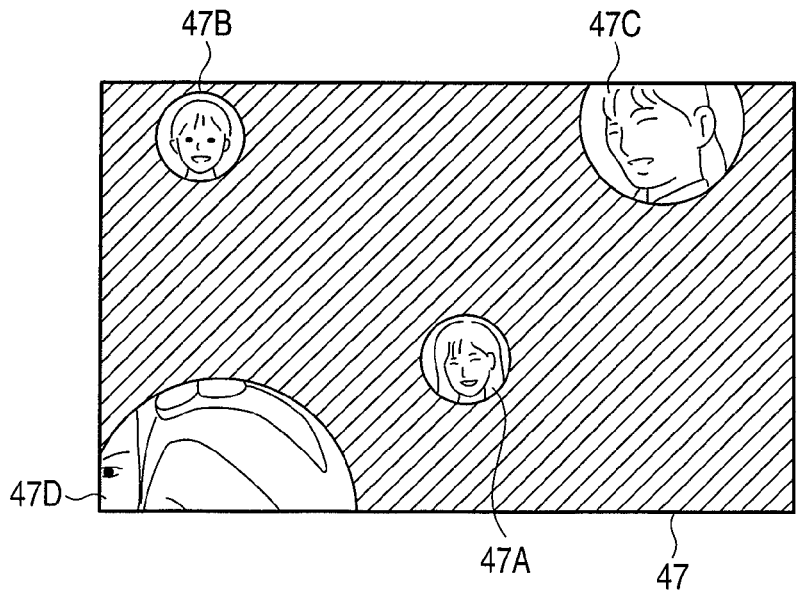
FIG. 11 is an exemplary view illustrating an example of another effect which is executed by the electronic apparatus of the embodiment.
Figure 10:
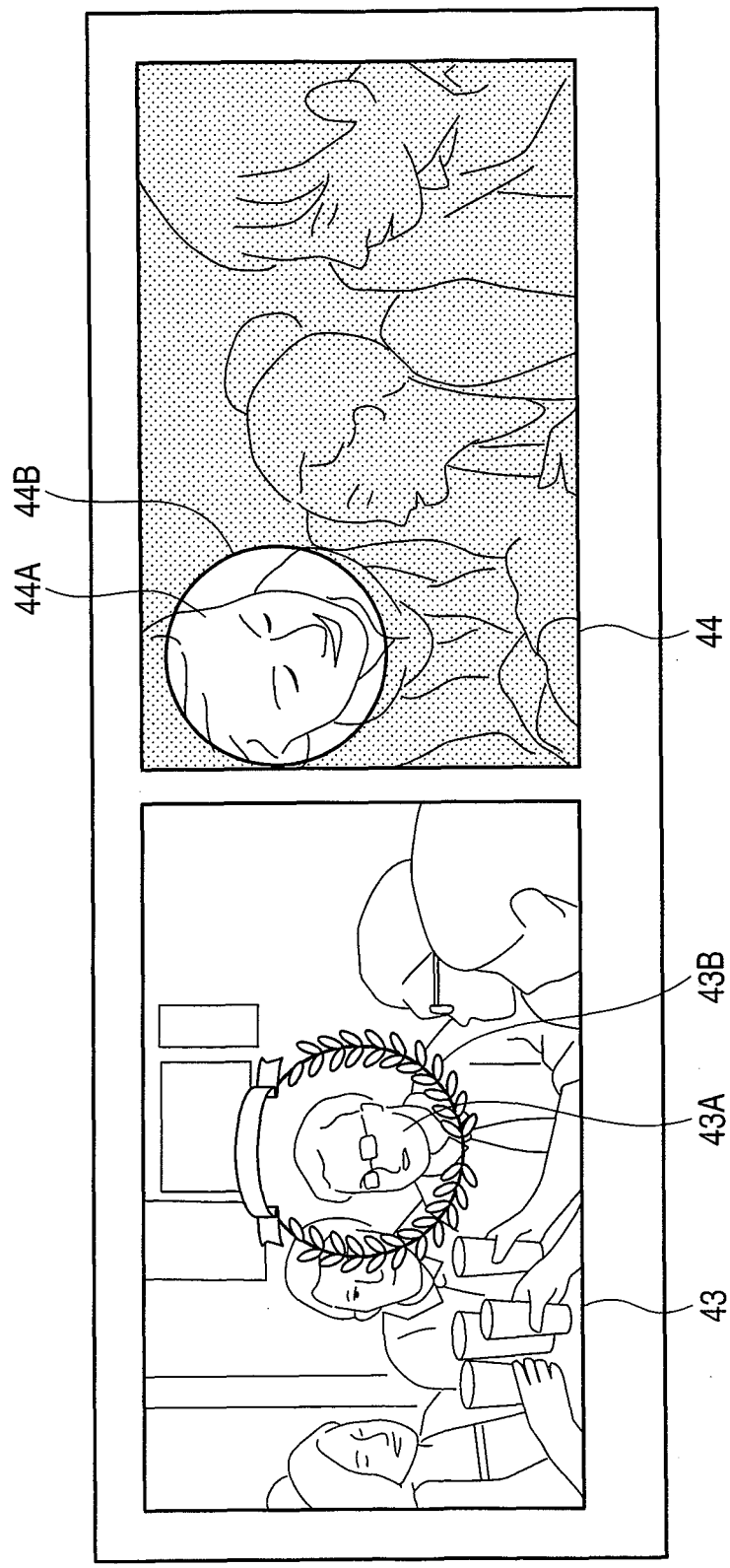
FIG. 10 is an exemplary view illustrating an example of an effect for emphasizing a face image in a still image, which is executed by the electronic apparatus of the embodiment.

Next, referring to FIG. 10 and FIG. 11, some examples of the effects are described.

FIG. 10 shows an example of the effect for emphasizing the face image of a person appearing in a still image. In a still image 43, an effect 43B for emphasizing a person 43A is applied to the face image of the person 43A. The effect 43B superimposes an illustration (object), which surrounds the face image, on the face image. In a still image 44, an effect 44B, which puts a spot on the face image of a person 44A, is applied to the face image of the person 44A. For example, in the still image 44, if the person 44A is the main character and the other two persons are side characters, it is possible to use an effect, such as a three-step spot light, which successively puts a spot in the order of "Side character 1", "Side character 2" and "Main character".

FIG. 11 shows an example in which an effect is applied to face images of persons appearing in a plurality of still images, respectively. A screen 47 shows face images 47A to 47D which are cut out of the still images. Such an effect is applied that the respective face images move on the screen 47.

As has been described above, according to the present embodiment, first still images including the face images of a selected person (main character) and second still images, which are relevant to the main character and include at least still images including face images of another person relevant to the main character, are extracted from a plurality of still images, and a movie (moving image) is played back by using the extracted first still images and the extracted second still images. In this manner, based on the face image of a selected person (main character), still images relevant to the main character are automatically extracted. Thereby, unexpected photos can be found and shown to the user. Moreover, by using the scenario information which specifies still image attributes such as a person attribute, a movie with a story-like plot can be created.

In the present embodiment, the scenario information designating the effect sequence and the still image attributes, which are to be used, has been described by way of example. However, when the slideshow is created, use may be made of scenario information which designates only the attributes of still images that are to be used. In addition, when the slideshow is created, a transition that is to be used may be designated in place of the effect that is to be used.

All the procedures of the playback process of the embodiment can be executed by software. Thus, the same advantageous effects as with the present embodiment can easily be obtained simply by installing a computer program, which executes the procedures of the playback process, into an ordinary computer through a computer-readable storage medium which stores the computer program, and executing the computer program.

The functions of the respective components shown in FIG. 3 may be realized by hardware such as a purpose-specific LSI, or a DSP.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    an indexing module configured to analyze a plurality of still images and to generate index information indicative of attributes of the plurality of still images, the index information comprising recognition results of a plurality of face images in the plurality of still images;

an extracting module configured to extract one or more first still images and one or more second still images from the plurality of still images based on the index information, the one or more first still images comprising one or more face images of a first person, the one or more second still images being relevant to the first person, and the one or more second still images comprising at least one still image comprising a face image of a second person relevant to the first person;

a scenario determination module configured to determine scenario information indicative of still images corresponding to a plurality of time segments, the scenario information comprising a person attribute indicating whether a person who is to appear in each time segment is the first person, a person associated with the first person, or both the first person, and the person associated with the first person; and a moving image creation module configured to create a moving image by extracting, from the extracted first still images and the extracted second still images, at least one still image including a face image of a person agreeing with the person attribute corresponding to each time segment, and by allocating the extracted at least one still image to each time segment.

2. The electronic apparatus of claim 1, wherein the scenario information comprises information indicative of an effect which is to be applied in each time segment, and further comprising a playback module configured to apply the effect, which is indicated by the scenario information and corresponds to each time segment, to the at least one still image allocated to each time segment.

3. A moving image playback method comprising:

analyzing a plurality of still images;

generating index information indicative of attributes of the plurality of still images, the index information comprising recognition results of a plurality of face images in the plurality of still images;

extracting one or more first still images and one or more second still images from the plurality of still images based on the index information, the first still images comprising face images of a first person, the one or more second still images being relevant to the first person, and the one or more second still images comprising at least one still image comprising a face image of a second person relevant to the first person;

determining scenario information indicative of still images corresponding to a plurality of time segments, the scenario information comprising a person attribute indicating whether a person who is to appear in each time segment is the first person, a person associated with the first person, or both the first person, and the person associated with the first person; and creating a moving image by extracting from the extracted first still images and the extracted second still images at least one still image including a face image of a person agreeing with the person attribute corresponding to each time segment, and by allocating the extracted at least one still image to each time segment.

4. The moving image playback method of claim 3, wherein the scenario information comprises information indicative of an effect which is to be applied in each time segment, further comprising applying the effect, which is indicated by the scenario information and corresponds to each time segment, to the at least one still image allocated to each time segment.

5. A computer-readable, non-transitory storage medium having stored thereon a computer program which is executable by a computer, the computer program controlling the computer to execute functions of:

analyzing a plurality of still images;

generating index information indicative of attributes of the plurality of still images, the index information comprising recognition results of a plurality of face images in the plurality of still images;

extracting one or more first still images and one or more second still images from the plurality of still images based on the index information, the first still images comprising face images of a first person, the one or more second still images being relevant to the first person, and the one or more second still images comprising at least one still image comprising a face image of a second person relevant to the first person;

determining scenario information indicative of still images corresponding to a plurality of time segments, the scenario information comprising a person attribute indicating whether a person who is to appear in each time segment is the first person, a person associated with the first person, or both the first person, and the person associated with the first person; and creating a moving image by extracting, from the extracted first still images and the extracted second still images, at least one still image including a face image of a person agreeing with the person attribute corresponding to each time segment, and by allocating the extracted at least one still image to each time segment.

6. The computer-readable, non-transitory storage medium of claim 5, wherein the scenario information comprises information indicative of an effect which is to be applied in each time segment; and the computer program controls the computer to execute a further function of applying the effect, which is indicated by the scenario information and corresponds to each time segment, to the at least one still image allocated to each time segment.

* * * * *